(12) United States Patent
Yoshida et al.

(10) Patent No.: US 8,126,513 B2
(45) Date of Patent: Feb. 28, 2012

(54) INFORMATION PROCESSING APPARATUS

(75) Inventors: Yuki Yoshida, Tokyo (JP); Akira Ishikura, Kanagawa-Ken (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 720 days.

(21) Appl. No.: 11/901,499

(22) Filed: Sep. 18, 2007

(65) Prior Publication Data

US 2008/0161060 A1 Jul. 3, 2008

(30) Foreign Application Priority Data

Dec. 27, 2006 (JP) ................. P2006-352290

(51) Int. Cl.
*H04M 1/00* (2006.01)
(52) U.S. Cl. .......... 455/566; 455/90.3; 455/550.1; 455/414.1; 362/276; 345/98; 345/102; 345/168; 345/169
(58) Field of Classification Search .......... 455/550.1, 455/414.1, 90.3, 566; 362/276; 345/98, 345/102, 168, 169
See application file for complete search history.

(56) References Cited

U.S. PATENT DOCUMENTS 5,675,286 A * 10/1997 Baker et al. ............ 330/129
(Continued)

FOREIGN PATENT DOCUMENTS

JP 2006-14074 A 1/2006

*Primary Examiner* — Olumide T Ajibade Akonai
(74) *Attorney, Agent, or Firm* — Maschoff Gilmore & Israelsen

(57) ABSTRACT

In a mobile phone applicable to an information processing apparatus, an illumination sensor detects a state of the mobile phone and generates a detection signal, a main controller determines whether or not the generated detection signal is larger than a predetermined reference value and allocates predetermined functions of operation to operation keys based on a result of determination with reference to a table in which the input units and the functions thereof are caused to previously correspond to each other and stored therein. With this arrangement, the number of operation keys or buttons is reduced without reducing the number of functions to be mounted, and the operability output stage line card group the mobile phone is improved even if the size thereof is reduced.

8 Claims, 11 Drawing Sheets

U.S. PATENT DOCUMENTS

| | | | |
|---|---|---|---|
| 6,161,944 A * | 12/2000 | Leman | 362/276 |
| 6,959,208 B2 * | 10/2005 | Tanaka et al. | 455/567 |
| 7,292,875 B2 * | 11/2007 | Chan et al. | 455/550.1 |
| 7,701,434 B2 * | 4/2010 | Kreek et al. | 345/102 |
| 2001/0040562 A1 * | 11/2001 | Masudaya | 345/173 |
| 2005/0037815 A1 * | 2/2005 | Besharat et al. | 455/566 |
| 2005/0051708 A1 * | 3/2005 | Hotelling | 250/214 AL |
| 2005/0225983 A1 * | 10/2005 | Fornell | 362/276 |
| 2007/0213090 A1 * | 9/2007 | Holmberg | 455/550.1 |

* cited by examiner

FUNCTION TABLE

| | WAITING | | KANA | | MAIL | | | | NUMERICAL CHARACTER (TWO-BYTE, ONE-BYTE) | | VARIOUS FUNCTIONS | |
|---|---|---|---|---|---|---|---|---|---|---|---|---|
| | | | | | | | A/a | | | | | |
| | EXTERNAL LIGHT | BLOCKED LIGHT | EXTERNAL LIGHT | BLOCKED LIGHT | EXTERNAL LIGHT | BLOCKED LIGHT | EXTERNAL LIGHT | BLOCKED LIGHT | EXTERNAL LIGHT | BLOCKED LIGHT | EXTERNAL LIGHT | BLOCKED LIGHT |
| POWER | | CAMERA START | SUBMENU | SUBMENU | SUBMENU | SUBMENU | SUBMENU | SUBMENU | SUBMENU | SUBMENU | ... | ... |
| CALL | | MAIL | CLEAR | CLEAR | CLEAR | CLEAR | CLEAR | CLEAR | CLEAR | CLEAR | ... | ... |
| CLEAR | | TELEPHONE DIRECTORY | SMALL CHARACTER/ LARGE CHARACTER CONVERSION | SMALL CHARACTER/ LARGE CHARACTER CONVERSION | SMALL CHARACTER/ LARGE CHARACTER CONVERSION | SMALL CHARACTER/ LARGE CHARACTER CONVERSION | SMALL CHARACTER/ LARGE CHARACTER CONVERSION | SMALL CHARACTER/ LARGE CHARACTER CONVERSION | SMALL CHARACTER/ LARGE CHARACTER CONVERSION | SMALL CHARACTER/ LARGE CHARACTER CONVERSION | ... | ... |
| 1 | | RECEPTION HISTORY | A | - | @ | - | 1 | - | 1 | - | ... | ... |
| 2 | | ↑ | KA | ← | ABC | ← | 2 | ← | 2 | ← | ... | ... |
| 3 | | TRANSMISSION HISTORY | SA | - | DEF | - | 3 | - | 3 | - | ... | ... |
| 4 | | ↓ | TA | ↓ | GHI | ↓ | 4 | ↓ | 4 | ↓ | ... | ... |
| 5 | | MENU KEY | NA | DECISION | JKL | DECISION | 5 | DECISION | 5 | DECISION | ... | ... |
| 6 | | ↑ | HA | ↑ | MNO | ↑ | 6 | ↑ | 6 | ↑ | ... | ... |
| 7 | | ← | MA | - | PQRS | - | 7 | - | 7 | - | ... | ... |
| 8 | | → | YA | → | TUV | → | 8 | → | 8 | → | ... | ... |
| 9 | | ↓ | RA | - | WXYZ | - | 9 | - | 9 | - | ... | ... |
| 0 | | 0 | WA | - | - | - | 0 | - | 0 | - | ... | ... |
| * | | * | ゛゜ | - | - | - | - | - | - | - | ... | ... |
| # | | EZ | 、。 | - | - | - | - | - | - | - | ... | ... |

FIG. 5

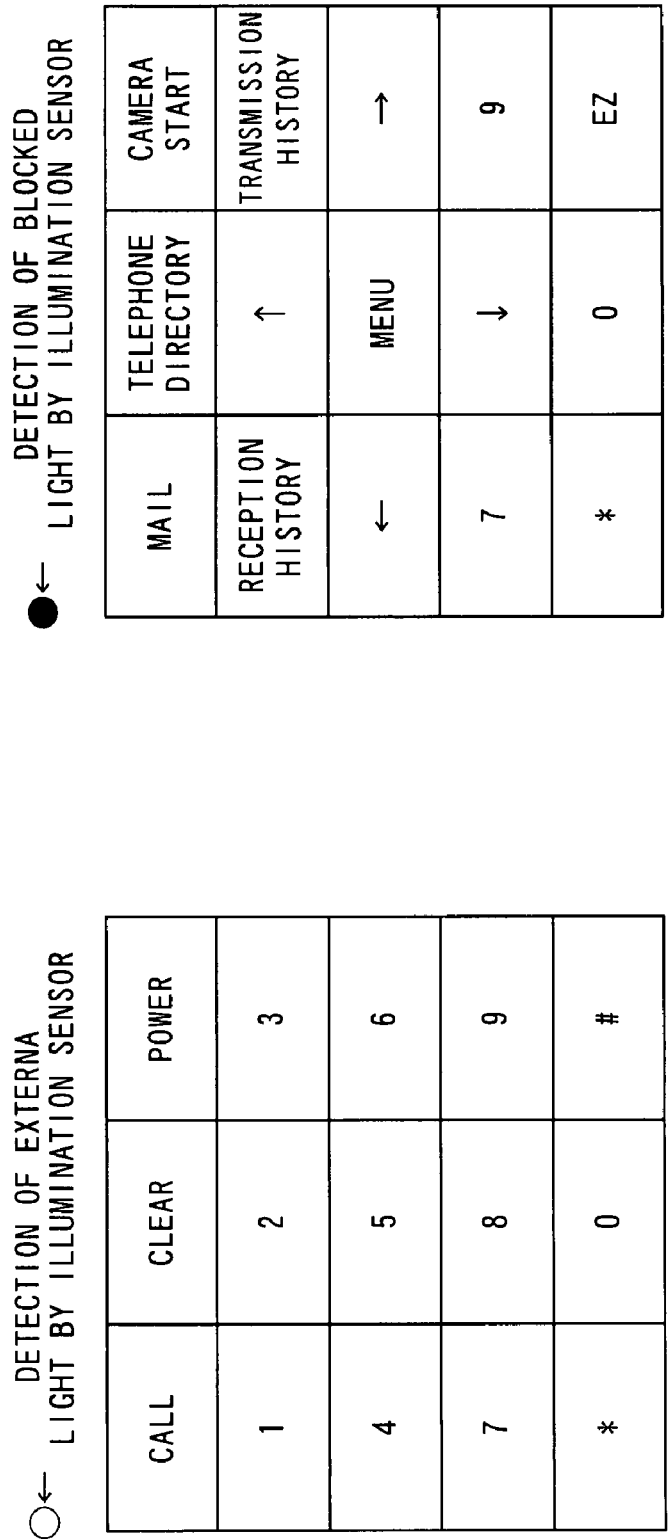

FIG. 8A

DETECTION OF
○← EXTERNAL LIGHT BY ILLUMINATION SENSOR

| SUBMENU | CLEAR | SMALL CHARACTER/ LARGE CHARACTER CONVERSION |
|---|---|---|
| A | KA | SA |
| TA | NA | HA |
| MA | YA | RA |
| ゛ ゜ | WA | ー、。 |

FIG. 8B

DETECTION OF
●← BLOCKED LIGHT BY ILLUMINATION SENSOR

| SUBMENU | CLEAR | SMALL CHARACTER/ LARGE CHARACTER CONVERSION |
|---|---|---|
| - | ↑ | - |
| ← | DECISION | → |
| - | ↓ | - |
| - | - | - |

FIG. 8C

DETECTION OF
○← EXTERNAL LIGHT BY ILLUMINATION SENSOR

| SUBMENU | CLEAR | SMALL CHARACTER/ LARGE CHARACTER CONVERSION |
|---|---|---|
| ./-@ | ABC | DEF |
| GHI | JKL | MNO |
| PQRS | TUV | WXYZ |
| - | - | - |

FIG. 8D

DETECTION OF
●← BLOCKED LIGHT BY ILLUMINATION SENSOR

| SUBMENU | CLEAR | SMALL CHARACTER/ LARGE CHARACTER CONVERSION |
|---|---|---|
| - | ↑ | - |
| ← | DECISION | → |
| - | ↓ | - |
| - | - | - |

FIG. 8E

DETECTION OF
○← EXTERNAL LIGHT BY ILLUMINATION SENSOR

| SUBMENU | CLEAR | SMALL CHARACTER/ LARGE CHARACTER CONVERSION |
|---|---|---|
| 1 | 2 | 3 |
| 4 | 5 | 6 |
| 7 | 8 | 9 |
| - | 0 | - |

FIG. 8F

DETECTION OF
●← BLOCKED LIGHT BY ILLUMINATION SENSOR

| SUBMENU | CLEAR | SMALL CHARACTER/ LARGE CHARACTER CONVERSION |
|---|---|---|
| - | ↑ | - |
| ← | DECISION | → |
| - | ↓ | - |
| - | - | - |

FIG. 10A ①← ILLUMINATION SENSOR ON (EXTERNAL LIGHT 1)

| | | CONVERSION |
|---|---|---|
| — | ./-@ | — |
| ABC | DEF | — |
| JKL | MNO | — |
| TUV | WXYZ | — |
| — | GHI | — |
| — | PQRS | — |

FIG. 10B ②← ILLUMINATION SENSOR ON (EXTERNAL LIGHT 2)

| | | CONVERSION |
|---|---|---|
| — | ./-@ | def |
| abc | | mno |
| ghi | jkl | wxyz |
| pqrs | tuv | — |

FIG. 10C ③← ILLUMINATION SENSOR ON (EXTERNAL LIGHT 3)

| | | CONVERSION |
|---|---|---|
| — | ./-@ | DEF |
| ABC | | MNO |
| GHI | JKL | WXYZ |
| PQRS | TUV | — |

FIG. 10D ④← ILLUMINATION SENSOR ON (EXTERNAL LIGHT 4)

| | | CONVERSION |
|---|---|---|
| — | ./-@ | def |
| abc | | mno |
| ghi | jkl | wxyz |
| pqrs | tuv | — |

FIG. 10E ●← ILLUMINATION SENSOR OFF (BLOCKED LIGHT)

| SUBMENU | CLEAR | — | — |
|---|---|---|---|
| — | ← | — | → |
| ↓ | DECISION | → | — |
| — | — | — | — |

FIG. 10F

EXTERNAL LIGHT 1 | EXTERNAL LIGHT 2 | EXTERNAL LIGHT 3 | EXTERNAL LIGHT 4 | BLOCKED LIGHT

INFORMATION PROCESSING APPARATUS

BACKGROUND OF THE INVENTION

1. Field of the Invention

The present invention relates to an information processing apparatus, and, more particularly, to an information processing apparatus having reduced number of operation keys.

2. Related Art

Recently, mobile terminals represented by mobile phones (or cellular phones) have been provided with various types of functions such as an address note function, a mail function through networks such as Internet, a browser function capable of accessing web pages, and the like, in addition to a simple communication function through a call.

As the mobile terminal is provided with a multifunction as described above, operation keys inherent to the respective functions must be provided. However, if the inherent operation keys are provided with respect to all the functions, the number of operation keys extremely increases.

To cope with this problem, there has been proposed a technology for reducing the number of operation keys by providing a software key in which one operation key has a plurality of functions and causing a user to operate the software key when respective functions are executed (refer to, for example, Japanese Unexamined Patent Application Publication No. 2006-14074).

However, in the conventional technology, not only the user must allocate a software key each time when a new function is added so that the user can operate the new function on a menu function, but also the user must newly allocate a software key for the new function in addition to existing software keys.

Accordingly, even if the software key, in which one operation key has a plurality of functions, is used, the number of operation keys still continuously increases because the mobile terminal is rapidly multifunctioned. In contrast, since the size of the mobile terminal is further reduced in consideration of a designed surface and portability, a lot of operation keys disposed to the mobile terminal are densely concentrated to a limited region. Therefore, it is inconvenient for the user to operate freely the operation keys.

SUMMARY OF THE INVENTION

The present invention was conceived in consideration of the circumstances encountered in the prior art mentioned above and an object thereof is to provide an information processing apparatus capable of reducing the number of operation keys or buttons without reducing the number of functions to be mounted as well as improving operability even if the size of the information processing apparatus is reduced.

To solve the above objects, an information processing apparatus according to the present invention includes a generation unit configured to detect the state of the information processing apparatus and to generate a detection signal, a determination unit configured to determine whether the detection signal generated by the generation unit is or larger than a predetermined reference value, and an allocation unit configured to allocate a predetermined function of operation to an input unit based on a result of determination of the determination unit with reference to a table in which the input unit and the function thereof are caused to previously correspond to each other and stored.

In the information processing apparatus of the present invention, a state of the mobile phone is detected, a detection signal is generated, it is determined whether or not the generated detection signal is larger than a predetermined reference value, and a function of predetermined operation is allocated to an input unit with reference to a table in which the input unit and the function thereof are caused to previously correspond to each other and stored.

According to the present invention, the number of operation keys or buttons can be reduced without reducing the number of functions to be mounted, as well as operability can be improved even if the size of the apparatus is reduced.

The nature and further characteristic features of the present invention will be made clearer from the following descriptions made with reference to the accompanying drawings.

BRIEF DESCRIPTION OF THE DRAWINGS

In the accompanying drawings:

FIG. 1 represents a mobile phone applicable to an information processing apparatus, in an opened state, according to the present invention, in which

FIG. 2 represents a mobile phone applicable to an information processing apparatus, in a closed state, according to the present invention, in which

FIG. 5 is a view showing an example of arrangement of a function table recorded to a ROM in a main controller or to a memory unit of FIG. 3;

FIG. 6 includes FIGS. 6A and 6B, which are views showing functions allocated to operation keys according to an external light detected by an illumination sensor;

FIG. 8 includes FIGS. 8A to 8F, which are views showing examples of functions allocated to the operation keys according to an external light detected by the illumination sensor;

FIG. 9 represents a mobile phone applicable to an information processing apparatus, in an opened state, according to the present invention, in which

FIG. 10 includes FIGS. 10A to 10F, which are views showing examples of functions allocated to the operation keys according to an external light detected by an illumination sensor when external light detection slits are formed.

DESCRIPTION OF THE PREFERRED EMBODIMENTS

Embodiments of the present invention will be explained with reference to the drawings.

Figure 1A:
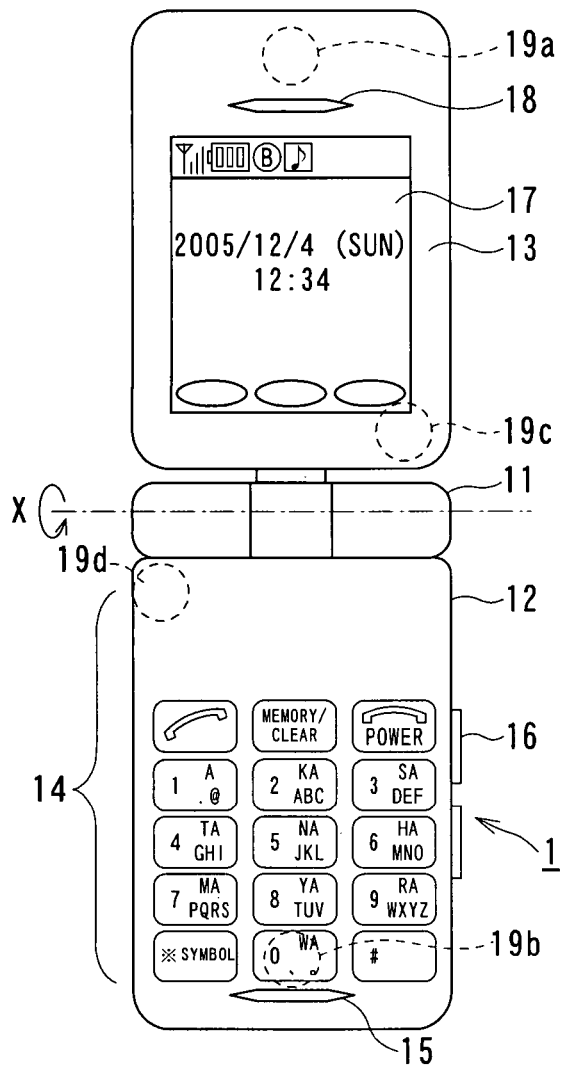
FIG. 1A is a front view thereof and FIG. 1B is a side view thereof.
Figure 1B:
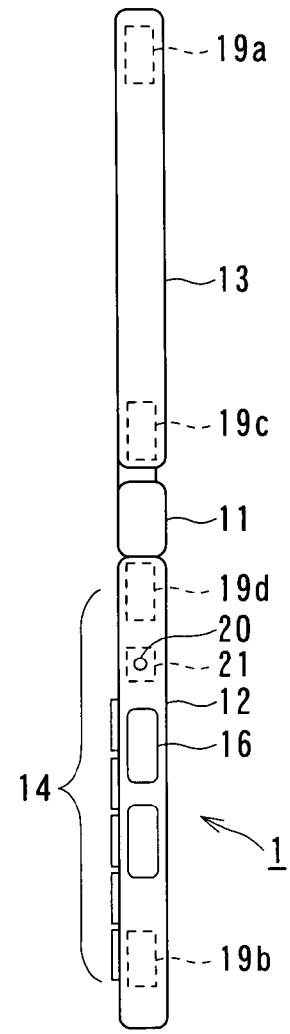

With reference to FIG. 1, FIG. 1A shows a case when the mobile phone it is opened about 180 degrees and viewed from a front surface, and FIG. 1B shows a case when it is viewed from a side surface in the open state.

As shown in FIGS. 1A and 1B, in the mobile phone (or cellular phone) 1, a first housing 12 is coupled with a second housing 13 through a central hinge portion 11 and these first and second housings 12 and 13 are folded in the direction of an arrow X through the hinge portion 11. A transmission/reception antenna (antenna 44 of FIG. 3 described hereinlater) is disposed at a predetermined position in the inside of the mobile phone 1, and a radio wave is transmitted and received between the mobile phone 1 and a base station, not shown, through a built-in antenna.

The first housing 12 includes operation keys 14 such as "0" to "9" numerical keys, a call key, an end of call/power supply key, a clear key, and the like arranged on the front surface thereof, and various types of instructions can be inputted by using the operation keys 14.

Furthermore, the first housing 12 includes a microphone 15 disposed below the operation keys 14, and the voice of a user is collected by the microphone 15 when a call is executed. The first housing 12 further includes a side key 16 for operating the mobile phone 1.

Further, the first housing 12 has a battery pack, not shown, inserted thereinto on the back surface side thereof, and when the end of call/power supply key is turned on, power is supplied from the battery pack to respective circuits so that the mobile phone 1 is placed in an operable state.

On the other hand, the second housing 13 includes a liquid crystal display 17 (main display) disposed on the front surface thereof. The liquid crystal display 17 displays a radio wave receiving state, an amount of remaining battery power, and opponent names, phone numbers, transmission histories, and the like registered as a telephone directory as well as the contents of e-mails, a simplified homepage, images picked up by a CCD camera (CCD camera 22 of FIG. 2 described hereinlater), the contents received from an external contents server, not shown, and the contents stored to a memory card (memory card 46 of FIG. 3 described hereinlater).

Further, a speaker 18 is disposed at a predetermined position above the liquid crystal display 17 so that the user can make a voice phone call.

The first and second housings 12 and 13 include magnetic sensors 19a, 19b, 19c, and 19d disposed at predetermined positions in the insides thereof so as to detect the state of the mobile phone 1.

An illumination sensor 20 is disposed at a predetermined position in the inside of the first housing 12 to detect the external light irradiated to the mobile phone 1 through an the external light detection hole 21 formed at a predetermined position of a side surface of the mobile phone 1 (position above the illumination sensor 20).

Figure 2A:
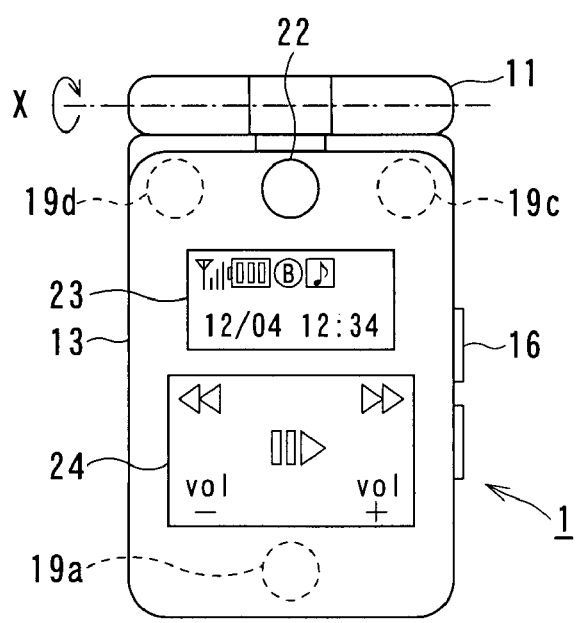
FIG. 2A is a front view thereof and FIG. 2B is a side view thereof.
Figure 2B:
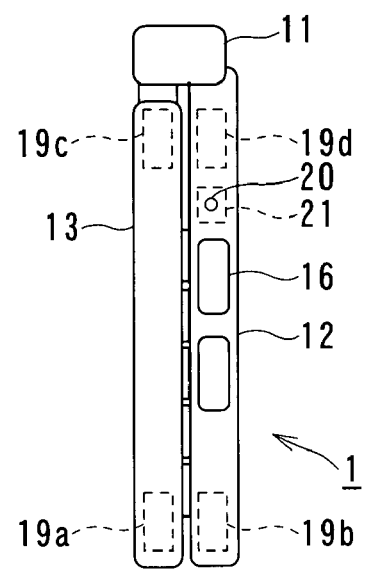

With reference to FIG. 2, the mobile phone 1 of FIG. 2 shows a state when it is turned in the direction of the arrow X from the state of the mobile phone 1 of FIG. 1. FIG. 2A shows a case when the mobile phone 1 is closed and viewed from the front surface, and FIG. 2B shows a case when the mobile phone 1 is closed and viewed from a side surface.

The second housing 13 includes the CCD camera 22 disposed to an upper portion of the second housing 13, so that the image of a desired target is picked up. A sub-display 23 is disposed below the CCD camera 22 and displays an antenna picto that shows a present sensitivity of the antenna, a battery picto that shows a present amount of remaining battery power of the mobile phone 1, a present time, and the like.

An electrostatic touch pad 24 is further disposed below the sub-display 23. Although the electrostatic touch pad 24 is seemingly composed of a sheet of a touch pad, a plurality of sensors, not shown, are disposed at a plurality of positions, and when the user touches the vicinities of the sensors, the sensors detect this fact and a rewinding function, a fast-feed function, a volume down operation, an volume up operation, a replay operation, a temporary stop operation, and the like operation are executed.

Figure 3:
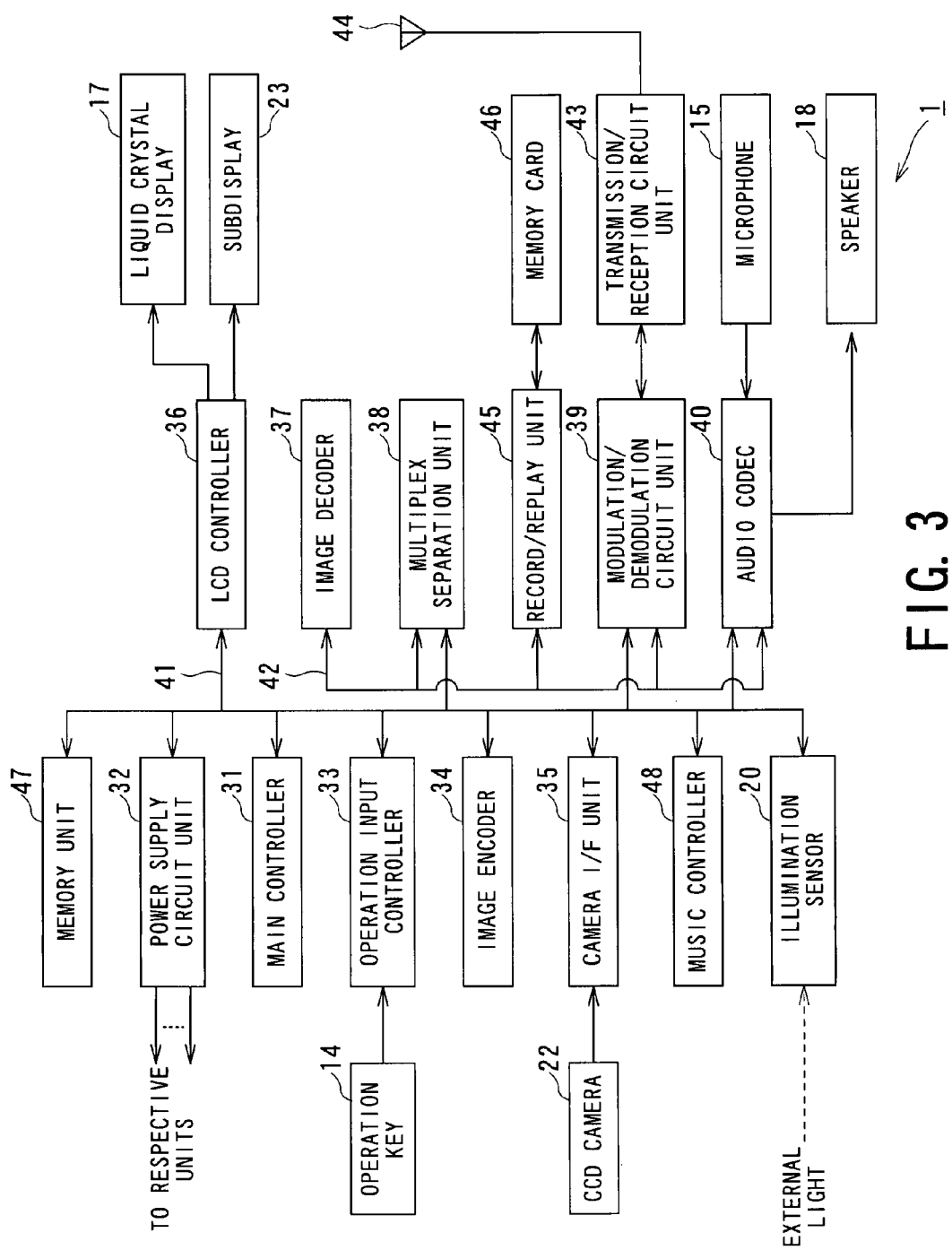
FIG. 3 is a block diagram showing an arrangement of an interior of the mobile phone applicable to the information processing apparatus according to the present invention.

FIG. 3 shows the arrangement of the inside of the mobile phone 1 applicable as the information processing apparatus according to the present invention.

As shown in FIG. 3, in the mobile phone 1, the illumination sensor 20, a power supply circuit unit 32, an operation input controller 33, an image encoder 34, a camera interface unit 35, an LCD controller 36, a multiplex separation unit 38, a modulation/demodulation circuit unit 39, an audio codec 40, a memory unit 47, and a music controller 48 are connected to a main controller 3, which integrally controls the respective units of the first and second housings 12 and 13, through a main bus 41. Likely, the image encoder 34, an image decoder 37, the multiplex separation unit 38, the modulation/demodulation circuit unit 39, the audio codec 40, and a record/replay unit 45 are connected to each other through a synchronous bus 42.

When the end of call/power supply key is turned on, the power supply circuit unit 32 supplies power from the battery pack to the respective units in response to the operation executed by the user, thereby starting the mobile phone 1 to an operable state.

The main controller 31 is composed of a CPU, a ROM, a RAM, and the like, the CPU executes various types of processings according to a program stored in the ROM or to various types of application programs loaded from the memory unit 47 as well as generates various types of control signals and supplies these signals to the respective units so as to integrally control the mobile phone 1. The RAM appropriately stores the data and the like which is required by the CPU to execute various types of processings.

Further, the main controller 31 has a built-in timer for accurately measuring a present date and time.

The mobile phone 1 converts the audio signal, which is collected by the microphone 15 in a voice communication mode, into a digital audio signal by the audio codec 40, compresses the digital audio signal, subjects the digital audio signal to a spectrum diffusion processing by the modulation/demodulation circuit unit 39, and transmits it through an antenna 44 after being subjected to a digital to analog conversion processing and to a frequency conversion processing by the transmission/reception circuit unit 43 under the control of the main controller 31.

The mobile phone 1 amplifies the signal, which is received through the antenna 44 in the voice communication mode, subjects the amplified signal to a frequency conversion processing and an analog to digital conversion processing, subjects the signal to a spectrum inverse diffusion processing by the modulation/demodulation circuit unit 39, extends the signal by the audio codec 40, converts the signal into an analog audio signal, and then outputs the converted analog audio signal through the speaker 18.

Further, when the mobile phone 1 transmits an e-mail in a data communication mode, the text data of the e-mail inputted by operating an operation key 14 is sent to the main controller 31 through the operation input controller 33. The main controller 31 subjects the text data to a spectrum diffusion processing by the modulation/demodulation circuit unit 39, subjects it to a digital to analog conversion processing and to a frequency conversion processing by the transmission/reception circuit unit 43, and then transmits it to the base station, not shown, through the antenna 44.

On the other hand, when the mobile phone 1 receives an e-mail in the data communication mode, the mobile phone 1 restores the signal, which is received from the base station (not shown) through the antenna 44, to an original text data by subjecting the signal to a spectrum inverse diffusion processing by the modulation/demodulation circuit unit 39, and then displays the signal on the liquid crystal display 17 through the LCD controller 36 as the e-mail.

Thereafter, the mobile phone 1 may also record the received e-mail to the memory card 46 through the record/replay unit 45 in response to a user's operation.

When the mobile phone 1 does not transmit an image signal picked out by the CCD camera 22, the mobile phone 1 directly displays the image signal on the liquid crystal display 17 through the camera interface unit 45 and the LCD control unit 46.

When the mobile phone 1 transmits an image signal picked up by the CCD camera 22 in the data communication mode, the image signal is supplied to the image encoder 34 through the camera interface unit 35.

The image encoder 34 converts the image signal supplied from the CCD camera 22 into a coded image signal by compressing and coding the signal by a predetermined coding system, for example, MPEG-4 and the like and sends the converted coded image signal to the multiplex separation unit 38. At that time, the mobile phone 1 simultaneously sends the sound collected by the microphone 15 while an image is being picked up by the CCD camera 22 to the multiplex separation unit 38 through the audio codec 40 as a digital audio signal.

The multiplex separation unit 38 multiplexes the coded image signal supplied from the image encoder 34 and the audio signal supplied from the audio codec 40 by a predetermined system, subjects a resultant multiplexed signal to a spectrum diffusion processing by the modulation/demodulation circuit unit 39, and transmits the signal through the antenna 44 after being subjected to a digital to analog conversion processing and to a frequency conversion processing by the transmission/reception circuit unit 43.

In contrast, the mobile phone 1 may receive data of a Web page in the data communication mode.

That is, when the mobile phone 1 transmits data for requesting, for example, the Web page in the data communication mode, data of the Web page is transmitted through the base station in response to the request. The data of the Web page is received by the transmission/reception circuit unit 43 and the modulation/demodulation circuit unit 39 through the antenna 44. The transmission/reception circuit unit 43 and the modulation/demodulation circuit unit 39 send the received data of the Web page to the main controller 31.

The main controller 31 interprets the data of the Web page and generates a screen (or image) based on the interpretation. The generated screen is supplied from the main controller 31 to the liquid crystal display 17 through the LCD controller 36 and displayed thereon. That is, the application program of at least a web browser is installed to the ROM of the main controller 31 or to the memory unit 47, and the CPU of the main controller 31 acts as the web browser by executing the application program of the web browser on the RAM and executes interpretation and the like of the data of the Web page.

Further, when the mobile phone 1 receives data of a moving image file linked to, for example, the Web page in the data communication mode, it subjects the signal, which is received from the base station, not shown, through the antenna 44, to a spectrum inverse diffusion processing by the modulation/demodulation circuit unit 39 and sends a resultant multiplexed signal to the multiplex separation unit 38.

The multiplex separation unit 38 separates the multiplexed signal to a coded image signal and an audio signal, supplies the coded image signal to the image decoder 37 and supplies the audio signal to the audio codec 40 through the synchronous bus 42. The image decoder 37 generates a replayed moving image signal by decoding the coded image signal by a decoding system corresponding to a predetermined coding system such as MPEG-4 and the like and supplies the thus generated replayed moving image signal to the liquid crystal display 17 through the LCD controller 36. With this operation, the moving image data included in the moving image file linked to, for example, the Web page is displayed.

After the audio codec 40 simultaneously converts the audio signal into an analog audio signal, the audio codec 40 supplies the analog audio signal to the speaker 18, and the audio signal included in the moving image file linked to, for example, the Web page is thereby replayed. The mobile phone 1 can record the received data linked to the Web page and the like to the memory card 46 through the record/replay unit 45 in response to a user's operation also in this case likewise the case of the e-mail.

The memory unit 47 is composed of, for example, a flash memory device which is a non-volatile memory that can be electrically rewritten or erased, an HDD and the like, and stores the various types of application programs executed by the CPU of the main controller 31 and various data groups. Further, the memory unit 47 stores the e-mails received in response to a user's operation and the moving image data and the like included in the moving image file linked to the receive Web page and the like when necessary.

The music controller 48 controls the execution of the replay operation, the temporary stop operation, the rewind function, the fast-feed function, the volume-down operation, the volume-up operation, and the like of the audio data stored in the memory unit 47.

The illumination sensor 20 is composed of, for example, a photodiode and the like. The illumination sensor 20 serves to detect the external light irradiated to the mobile phone 1 through the external light detection hole 21, generate a detection signal, and supply the generated detection signal to the main controller 31 through the main bus 41.

Next, a function allocation processing in the mobile phone 1 of FIG. 3 will be explained with reference to a flowchart of FIG. 4. The function allocation processing is started when the mobile phone 1 is opened by the user.

When the mobile phone 1 is opened by the user at step S1, the main controller 31 controls the LCD controller 36 and causes the liquid crystal display 17 to display a waiting screen. The liquid crystal display 17 displays the waiting screen under the control of the LCD controller 36.

At step S2, the illumination sensor 20 detects the external light irradiated to the mobile phone 1 through the external light detection hole 21 under the control of the main controller 31, generates a detection signal, and supplies the generated detection signal to the main controller 31 through the main bus 41. The detection signal contains an electronic signal according to the luminous intensity (amount of light) of the external light irradiated to the mobile phone 1.

That is, when the external light detection hole 21 formed at the predetermined position of the side surface of the mobile phone 1 (i.e., the position above the illumination sensor 20) is covered with, for example, a finger or a part of a hand of the user, since the external light irradiated to the mobile phone 1 is approximately blocked, the luminous intensity (amount of light) of the external light irradiated to the mobile phone 1 is reduced, the detection signal generated by the illumination sensor 20 contains an electronic signal according to the luminous intensity (amount of light) which is reduced by blocking the external light.

In contrast, when the external light detection hole 21 formed at the predetermined position of the side surface of the mobile phone 1 (i.e., the position above the illumination sensor 20) is not covered with, for example, a finger or a part of a hand of the user, since the external light irradiated to the mobile phone 1 is not blocked, the detection signal generated by the illumination sensor 20 contains an electronic signal according to the luminance intensity (amount of light) of the external light irradiated to the mobile phone 1 without being blocked.

At step S3, the main controller 31 obtains the detection signal supplied from the illumination sensor 20 and determines whether or not the obtained detection signal is larger than a predetermined reference value.

When it is determined at step S3 that the detection signal obtained at step S3 is or larger than the predetermined reference value, the main controller 31 recognizes at step S4 that the external light detection hole 21 formed at the predetermined position of the side surface of the mobile phone 1 (i.e., the position above the illumination sensor 20) is not covered with, for example, a finger or a part of a hand of the user, (that is, the main controller 31 recognizes that the external light enters from the external light detection hole 21 without being blocked) reads out a function table in which the operation keys 14 previously stored to the ROM of the main controller 31 or to the memory unit 47 and the functions thereof are caused to correspond to each other.

For example, a function table as shown in FIG. 5 is read out from the ROM of the main controller 31 or the memory unit 47. For example, in the case of FIG. 5, in the case when the waiting screen is displayed on the liquid crystal display 17 (that is, at the time when the external light enters from the external light detection hole 21 without being blocked), when the external light detection hole 21 formed at the predetermined position of the side surface of the mobile phone 1 (i.e., the position above the illumination sensor 20) is not covered with, for example, a finger or a part of a hand of the user, the functions of dials (1, 2, 3, . . . ), a call key (incoming and outgoing calls), a clear key, a power on/off, and the like are caused to correspond to the operation keys 14 as "an ordinary operation on the waiting screen".

On the other hand, in the case when the waiting screen is displayed on the liquid crystal display 17 (that is, when the external light enters from the external light detection hole 21 while being blocked), when the external light detection hole 21 formed at the predetermined position of the side surface of the mobile phone 1 (the position above the illumination sensor 20) is covered with, for example, a finger or a part of a hand of the user, the functions of a camera start, a mail, a phone directory, a menu key, a cross key, and the like are caused to correspond to the operation keys 14 as "a shift key operation on the waiting screen".

At step S5, the main controller 31 allocates the functions of the ordinary operation on the waiting screen to the operation keys 14 with reference to the read out function table. In this case, since it is recognized that the external light detection hole 21 formed at the predetermined position of the side surface of the mobile phone 1 (the position above the illumination sensor 20) is not covered with, for example, a finger or a part of a hand of the user (that is, since it is recognized that the external light enters from the external light detection hole 21 without being blocked), the functions of the dial (1, 2, 3, . . . ), the call key (incoming and outgoing calls), the power on/off, and the like are caused to correspond to the operation keys 14 as "the ordinary operation on the waiting screen" as shown in FIG. 6A.

Further, in the step S3, when it is determined that the obtained detection signal is smaller than the predetermined reference value, the main controller 31 recognizes in the step S6 that the external light detection hole 21 formed at the predetermined position of the side surface of the mobile phone 1 (i.e., the position above the illumination sensor 20) is covered with, for example, a finger or a part of a hand of the user (that is, the external light enters from the external light detection hole 21 while being blocked), and then reads out the function table in which the operation keys 14 previously stored to the ROM of the main controller 31 or to the memory unit 47 are caused to correspond to the functions thereof.

At step S7, the main controller 31 allocates the functions of the shift key operation on the waiting screen to the operation keys 14 with reference to the read out function table. In this case, since it is recognized that the external light detection hole 21 formed at the predetermined position of the side surface of the mobile phone 1 (i.e., the position above the illumination sensor 20) is covered with, for example, a finger or a part of a hand of the user, (that is, it is recognized that the external light enters from the external light detection hole 21 while being blocked), the functions of the camera start, a mail, a telephone directory, the cross key, and the like are allocated to the operation keys 14 as "the shift key operation on the waiting screen" as shown in FIG. 6B.

When the operation keys 14 are operated by the user, according to demand, through the operation input controller 33, the main controller 31 determines, at step S8, whether any input by what operation keys 14 is received. When it is determined, at the step S8, that an input of any of the operation keys 14 is not received, the processing returns to the step S1, and the processings at the step S1 and subsequent steps are repeated. That is, the waiting screen is displayed, the external light irradiated to the mobile phone 1 is detected by the illumination sensor 20, a detection signal is generated according to the luminance intensity (amount of light) of the detected external light, and the functions of the operation keys 14 are allocated based on the generated detection signal.

With this operation, the user can use the operation keys 14 while switching the functions thereof to the functions which are desired to be used by covering the external light detection hole 21 when necessary.

When it is determined, at the step S8, that an input of any of the operation keys 14 is received, the main controller 31 executes at step S9 the function allocated to the operation key 14, an input of which is received through the operation input controller 33.

Specifically, when an input from the dial "9" in the operation keys 14 is received by the user without covering the external light detection hole 21 formed at the predetermined position of the side surface of the mobile phone 1 (i.e., the position above the illumination sensor 20) with, for example, a finger or a part of a hand of the user, the dial "9" is displayed on the waiting screen of the liquid crystal display 17 because the function allocated to the dial "9" in the operation keys 14 is the function of the dial "9".

On the other hand, when an input of a dial "5" of the operation keys 14 is received by the user after the external light detection hole 21 formed at the predetermined position of the side surface of the mobile phone 1 (i.e., the position above the illumination sensor 20) is covered with, for example, a finger or a part of a hand of the user, a menu operation screen is displayed on the waiting screen of the liquid crystal display 17 because the function allocated to the dial "5" in the operation keys 14 is the function of a present menu key.

Further, when an input of the end of call/power supply key in the operation keys 14 is received by the user, since the function allocated to the end of call/power supply key in the operation keys 14 at the time is a camera start function, an application program for executing a camera function, which is previously stored to the ROM of the main controller 31 or to the memory unit 47, is read out, and the camera start function is executed, as well as a camera operation screen is displayed on the waiting screen of the liquid crystal display 17.

Thereafter, when the execution of the function allocated to the operation key 14 of which input is received is ended, the processing returns to step the S1, and the processings at the step S1 and the subsequent steps are repeated. That is, the waiting screen is displayed, the external light irradiated to the mobile phone 1 is detected by the illumination sensor 20, the detection signal is generated according to the luminance intensity (amount of light) of the detected external light, and the functions of the operation keys 14 are allocated based on the generated detection signal.

In the embodiment of the present invention, the external light irradiated to the mobile phone 1 is detected by the illumination sensor 20 disposed at the predetermined position of the inside of the mobile phone 1, a detection signal is generated, it is determined whether or not the generated detection signal is larger than the predetermined reference value, and the functions can be allocated to the operation keys 14 based on a result of this determination with reference to the function table in which the operation keys 14 and the functions thereof are previously caused to correspond to each other. Thereafter, when the user operates the operation key 14 and an input of the operation key 14 is received, the function allocated to the operation key 14 can be executed.

According to this operation, the external light detected by the illumination sensor 20 is used as a shift key, and it becomes not necessary for the user to allocate a software key each time a new function is added so that the user can operate the new function on the screen and to newly allocate a software key for the new function accordingly, in addition of the existing software keys.

Furthermore, the external light detected by the illumination sensor 20 is used as the shift key, so that a plurality of functions can be allocated to all the minimum possible number of the operation keys 14. As a result, since it is sufficient to provide the mobile phone 1 with the minimum possible number of the operation keys 14, the number of the operation keys disposed to the mobile phone 1 can be greatly reduced.

In addition, since the number of the operation keys 14 disposed to the mobile phone 1 is greatly reduced, even if the size of the mobile phone 1 is rapidly reduced, the size of the respective operation keys 14 can be maintained or more increased. As a result, the operatability of the mobile phone 1 can be improved.

As described above, the number of the operation keys 14 (buttons) of the mobile phone 1 can be greatly reduced without reducing the number of the functions mounted thereon, as well as the operatability of the mobile phone 1 can be improved even if the size thereof is reduced.

Incidentally, in the function allocation processing explained with reference to the flowchart of FIG. 4, after the predetermined function is executed at step S9 of the FIG. 4, the waiting screen is displayed and the same processings are executed at the step S1 and the subsequent steps. That is, the functions of the ordinary operation and the functions of the shift key operation are allocated to the operation keys 14 according to the luminance intensity (amount of light) of the external light detected through the external light detection hole 21.

The present invention is, however, not limited to the case, and when, for example, a mail function is executed at the step S9 and, for example, a mail generation screen is displayed on the liquid crystal display 17, a function for inputting "katakana" characters and English characters, which are used when a mail is generated by executing a mail function, may be allocated to the operation keys 14.

A function allocation processing using the method will be explained below.

Figure 7:
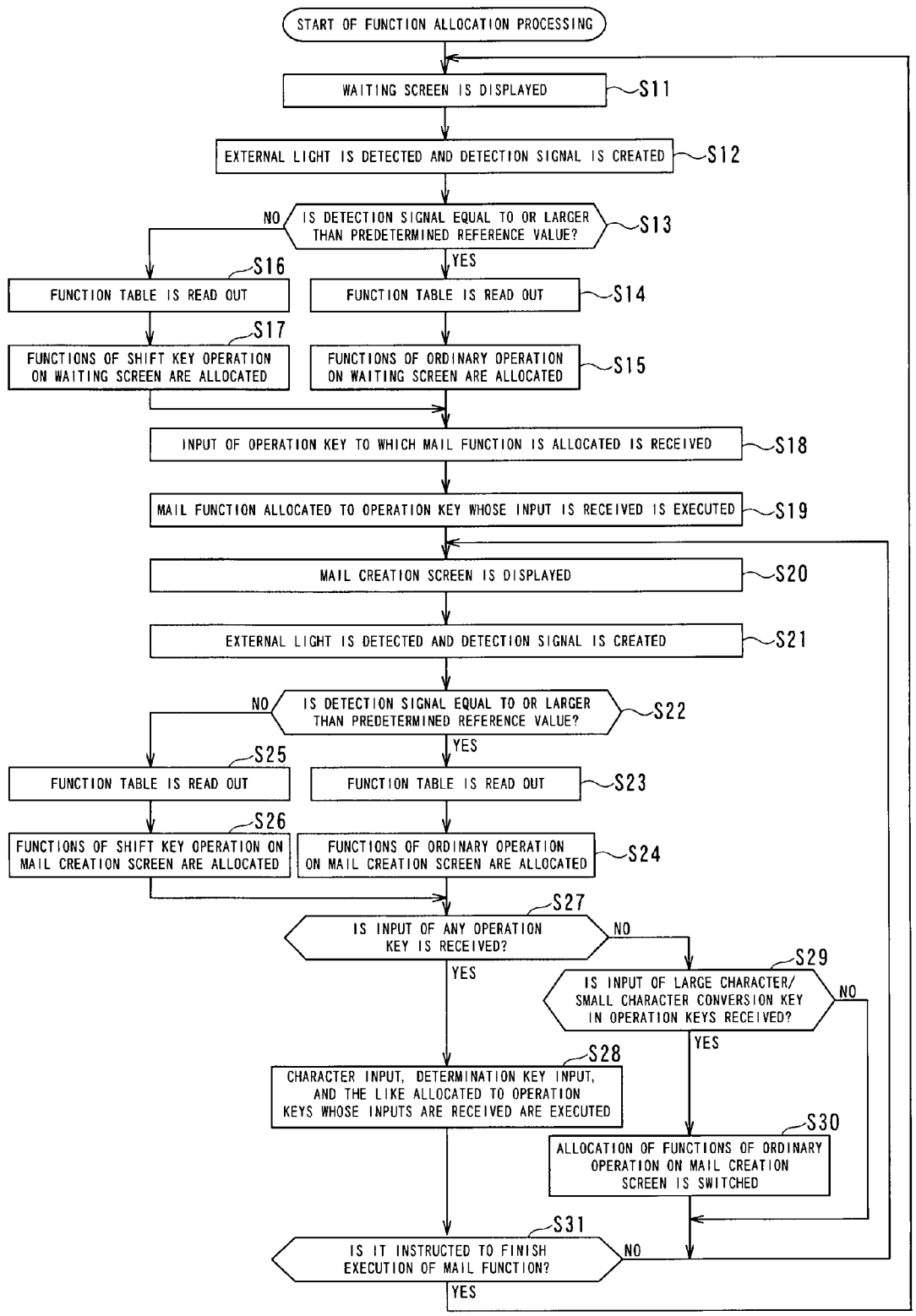
FIG. 7 is a flowchart explaining another function allocation processing in the mobile phone of FIG. 3.

Another function allocation processing in the mobile phone 1 of FIG. 3 will be explained with reference to a flowchart of FIG. 7. Further, it is to be noted that since the processings from steps S11 to S17 of FIG. 7 are the same as those from steps S1 to S7 of FIG. 4, explanation of the processings is omitted herein to prevent repeated explanation.

At step S18, when a call key in the operation keys 14 is operated by the user on the waiting screen through the operation input controller 33, the main controller 31 receives an input of the call key (i.e., the operation key 14) to which the mail function is allocated as shown in FIG. 6A.

At step S19, the main controller 31 executes the mail function allocated to the call key that is the operation key 14 of which input is received through the operation input controller 33.

At this time, a mail function screen is displayed on the liquid crystal display 17, and then, when an instruction for generating a mail is received on the mail function screen displayed on the liquid crystal display 17, a mail generation screen is displayed on the liquid crystal display 17.

At step S20, the main controller 31 controls the LCD controller 36 and causes the liquid crystal display 17 to display the mail generation screen which is a screen for generating a mail in the mail function. The liquid crystal display 17 displays the mail generation screen which is the screen for generating the mail in the mail function under the control of the LCD controller 36.

Figure 4:
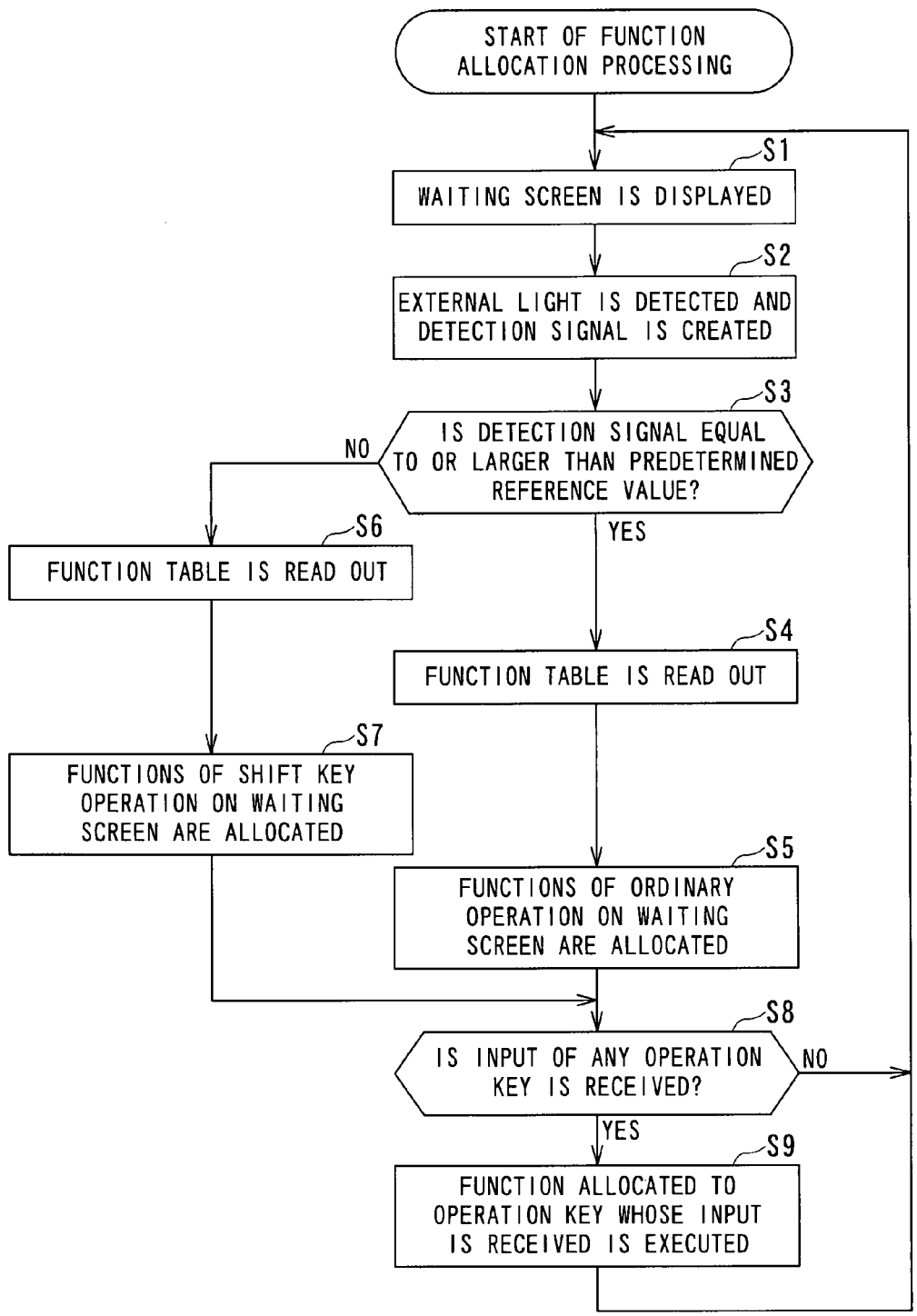
FIG. 4 is a flowchart explaining a function allocation processing in the mobile phone of FIG. 3.

At step S21, the illumination sensor 20 detects the external light irradiated to the mobile phone 1 through the external light detection hole 21 under the control of the main controller 31, generates a detection signal, and supplies the generated detection signal to the main controller 31 through the main bus 41 likewise the case explained with respect to the step S2 of FIG. 4. The detection signal contains an electronic signal according to the luminance intensity (amount of light) of the external light irradiated to the mobile phone 1.

At step S22, the main controller 31 obtains the detection signal supplied from the illumination sensor 20 and determines whether or not the obtained detection signal is larger than the predetermined reference value.

When it is determined, at the step S22, that the obtained detection signal is larger than the predetermined reference value, the main controller 31 recognizes, at step S23, that the external light detection hole 21 formed at the predetermined position of the side surface of the mobile phone 1 (the position above the illumination sensor 20) is not covered with, for example, a finger or a part of a hand of the user (that is, the external light enters from the external light detection hole 21 without being blocked at the time) and reads out the function table in which the operation keys 14 previously stored to the ROM of the main controller 31 or to the memory unit 47 are caused to correspond to the functions thereof.

The function table as shown in, for example, FIG. 5 is read out from the ROM of the main controller 31 or the memory unit 47. In the case when the mail generation screen is displayed on the liquid crystal display 17 in, for example, FIG. 5, when the external light detection hole 21 formed at the predetermined position of the side surface of the mobile phone 1 (i.e., the position above the illumination sensor 20) is not covered with, for example, a finger or a part of a hand of the user (that is, the external light enters from the external light detection hole 21 without being blocked), the functions of a submenu, the clear key, a large character/small character conversion key, "katakana" character input keys (for example, "a", "ka", "sa"), and the like are caused to correspond to the operation keys 14 as "an ordinary operation on the mail generation screen".

On the other hand, in the case when the mail generation screen is displayed on the liquid crystal display 17 (that is, when the external light enters from the external light detection hole 21 while being blocked), when the external light detection hole 21 formed at the predetermined position of the side surface of the mobile phone 1 (i.e., the position above the illumination sensor 20) is covered with, for example, a finger or a part of a hand of the user, the submenu, the clear key, the small character/large character conversion key, the cross key, a determination key, and the like are caused to correspond to the operation keys 14 as "a shift key operation on the mail generation screen".

At step S24, the main controller 31 allocates the functions of the ordinary operation on the mail generation screen to the operation keys 14 with reference to the read out function table. In this case, since it is recognized that the external light detection hole 21 formed at the predetermined position of the side surface of the mobile phone 1 (i.e., the position above the illumination sensor 20) is not covered with, for example, a finger or a part of a hand of the user (that is, the external light enters from the external light detection hole 21 without being blocked), the functions of the submenu, the clear key, the large character/small character conversion key, the "katakana" character input key (for example, "a", "ka", "sa" . . . ), and the like are allocated to the operation keys 14 as "the ordinary operation on the mail generation screen" as shown in FIG. 8A.

On the other hand, when it is determined that the detection signal obtained at the step S22 is smaller than the predetermined reference value, the main controller 31 recognizes, at the step S25, that the external light detection hole 21 formed at the predetermined position of the side surface of the mobile phone 1 (i.e., the position above the illumination sensor 20) is covered with, for example, a finger or a part of a hand of the user (that is, the external light enters from the external light detection hole 21 while being blocked) and reads out the function table in which the operation keys 14 previously stored to the ROM of the main controller 31 or to the memory unit 47 are caused to correspond to the functions thereof.

At step S26, the main controller 31 allocates the functions of the shift key operation on the mail generation screen to the operation keys 14 with reference to the read out function table. In this case, it is recognized that the external light detection hole 21 formed at the predetermined position of the side surface of the mobile phone 1 (i.e., the position above the illumination sensor 20) is covered with, for example, a finger or a part of a hand of the user (that is, the external light enters from the external light detection hole 21 while being blocked), and the functions of the submenu, the clear key, the large character/small character conversion key, the cross key, the determination key, and the like are allocated to the operation keys 14 as "the shift key operation on the mail generation screen" as shown in FIG. 8B.

Further, since the user operates an operation key 14 through the operation input controller 33 at step S27, the main controller 31 determines at the step S27 whether or not an input is received from any of the operation keys 14.

When it is determined at the step S27 that the input of any of the operation keys 14 is received, the main controller 31 executes at step S28 a character input, an determination key input, or the like which is allocated to the operation key 14 whose input is received through the operation input controller 33.

Specifically, when the external light detection hole 21 formed at the predetermined position of the side surface of the mobile phone 1 (i.e., the position above the illumination sensor 20) is not covered with, for example, a finger or a part of a hand of the user, and an input from the operation key at the position of a dial "1" in the operation keys 14 is received by the user, the function allocated to the operation key at the position of the dial "1" is a function of inputting a "katakana" character "a", the katakana character "a" is displayed on the mail generation screen of the liquid crystal display 17.

Further, when the user receives an input from the operation key at the position of a dial "4" in the operation keys 14 after the external light detection hole 21 formed at the predetermined position of the side surface of the mobile phone 1 (i.e., the position above the illumination sensor 20) is covered with, for example, a finger or a part of a hand of the user, the function allocated to the operation key at the position of the dial "4" is a left key (which is shown by a left arrow) function (that is, a function for moving a cursor in a left direction), and accordingly, the cursor shown on the mail generation screen of the liquid crystal display 17 is moved in the left direction.

When it is determined, at the step S27, that an input from any of the operation keys 14 is not received, since the user operates at step S29 an operation key 14 through the operation input controller 33, the main controller 31 determines whether or not an input of the large character/small character conversion key in the operation keys 14 is received.

When it is determined, at the step S29, that the input from the large character/small character conversion key in the operation keys 14 is received, the main controller 31 switches at step S30 the allocated function of the ordinary operation on the mail generation screen.

That is, when the user operates an operation key 14 and an input from the large character/small character conversion key is received at the time when the function of the ordinary operation allocated on the mail generation screen at present is, for example, the function of the ordinary operation for inputting "katakana" characters shown in FIG. 8A, the function of the ordinary operation for inputting the "katakana" characters is hierarchically switched to the function the of ordinary operation for inputting English characters shown in, for example, FIG. 8C. At this time, the functions of the shift key operation which are allocated on the mail generation screen at present are not fundamentally switched as shown in FIGS. 8B and 8D.

Thereafter, when an input of the large character/small character conversion key in the operation keys 14 is further received at the step S29, the function of the ordinary operation for inputting English characters shown in, for example, FIG. 8C is switched to the function of the ordinary operation of inputting numerical characters shown in FIG. 8E. At this time, the functions of the shift key operation allocated on the mail generation screen at present are not fundamentally switched as shown in FIGS. 8D and 8F.

Further, the large character/small character conversion key in the operation keys 14 is defined as a switch key for switching a predetermined operation function allocated to an operation key 14 to other operation function.

When it is determined, at the step S29, that the input of the large character/small character conversion key in the operation keys 14 is not received, the switch processing at the step S30 is skipped. Thereafter, the processing goes to step S31.

When the user operates, for example, the clear key in the operation keys 14 through the operation input controller 33, the main controller 31 determines at the step S31 whether it is instructed to finish the mail function or not.

When it is determined, at the step S31, that it is not instructed to finish the mail function, the processing returns to the step S20, and the processing at the step S20 and the subsequent steps is repeated. With this operation, the user can input data through the operation keys 14 after desired functions (for example, functions for inputting "katakana" characters, English characters, and the like) are allocated thereto as occasion demands.

Further, when a function of the ordinary operation allocated on the mail generation screen is switched at the step S30, the switched function of the ordinary operation is allocated by a processing executed at the step S24 thereafter.

When it is determined, at the step S31, that it is instructed to finish the mail function, the processing returns to step S11, and the processings at step S11 and subsequent steps are repeated.

Accordingly, when, for example, a mail is generated by executing the mail function, the functions for inputting "katakana" characters, English characters, and the like used to generate the mail can be appropriately allocated to operation keys 14.

Therefore, the user can simply generate a mail using the functions of inputting the "katakana" characters and the English characters allocated to the operation keys 14.

As a result, the number of the operation keys 14 (buttons) of the mobile phone 1 can be greatly reduced without reducing the number of the functions mounted thereon, and the operability of the mobile phone 1 can be more improved even if the size thereof is reduced.

Further, although the function allocation processing explained with reference to the flowchart of FIG. 4 or FIG. 7 is applied to the operations on the waiting screen and the mail generation screen, it may be also applied to the other various types of functions.

Furthermore, the function allocation processing explained with reference to the flowchart of FIG. 4 or FIG. 7, the illumination sensor 20 detects the external light irradiated to the mobile phone 1, a detection signal according to the luminance intensity (amount of light) of the external light is generated, and it is determined whether the generated detection signal is larger than the predetermined reference value so that the functions allocated to the operation keys 14 are switched to the two types of the functions of the ordinary operation and the functions of the shift key operation on the waiting screen. However the present invention is not limited thereto. For example, two or more predetermined reference values may be provided (for example, first and second reference values and the like are provided), and it may be determined whether the detection signal according to the luminance intensity (amount of light) of the external light irradiated to the mobile phone 1 larger than any of these reference values so that the functions allocated to the operation keys 14 can be switched to at least three types of functions having a larger number of steps.

Figure 9A:
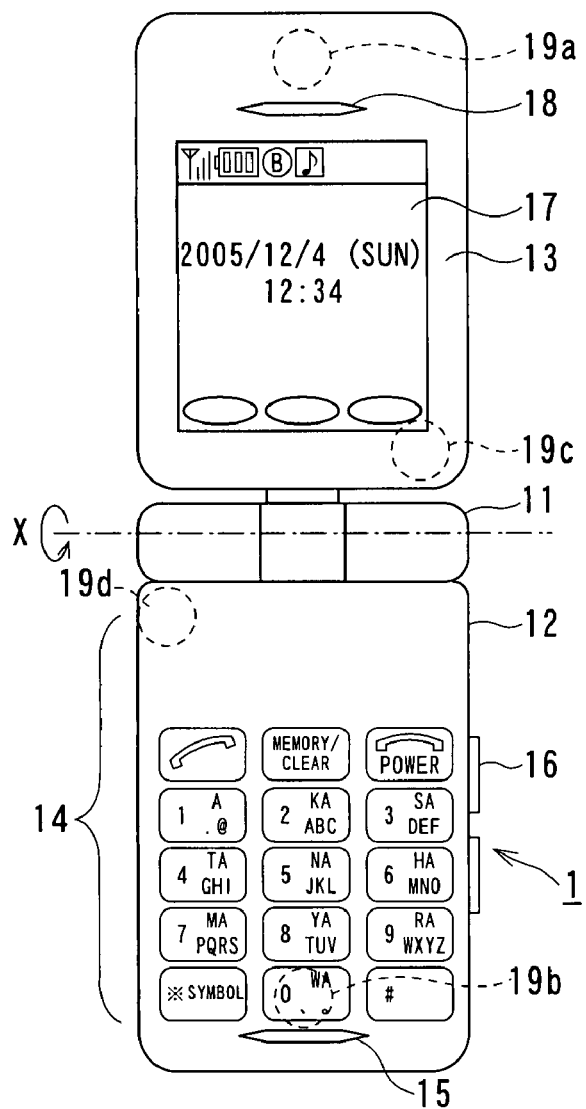
FIG. 9A is a front view thereof and FIG. 9B is a side view thereof.
Figure 9B:
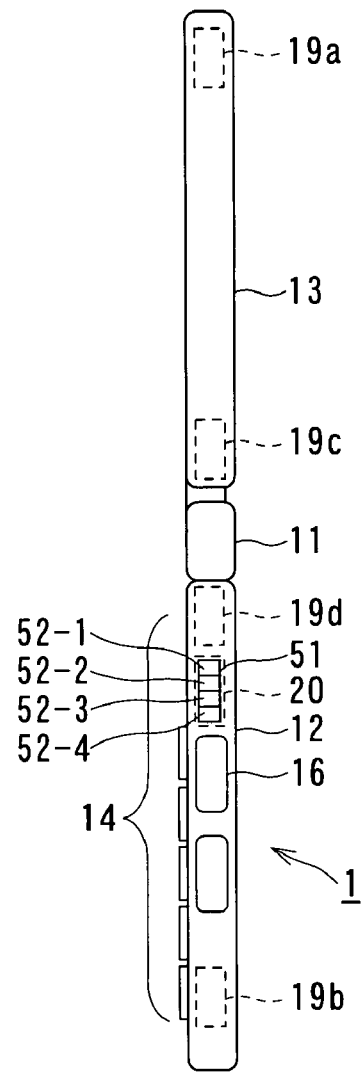

At that time, an external light detection slit 51 composed of a plurality of slits 52-1 to 52-4 is provided as shown in, for example, FIG. 9B in place of the external light detection hole 21 formed to the predetermined position of the side surface of the mobile phone 1. According to this arrangement, the user can switch the functions allocated to the operation keys 14 to five types of functions having a large number of steps depending on the range of the area of the slit 52-1 to 52-4 and the like in the external light detection slit 51 covered with, for example, a finger as shown in, for example, FIG. 10F.

Figure 11:
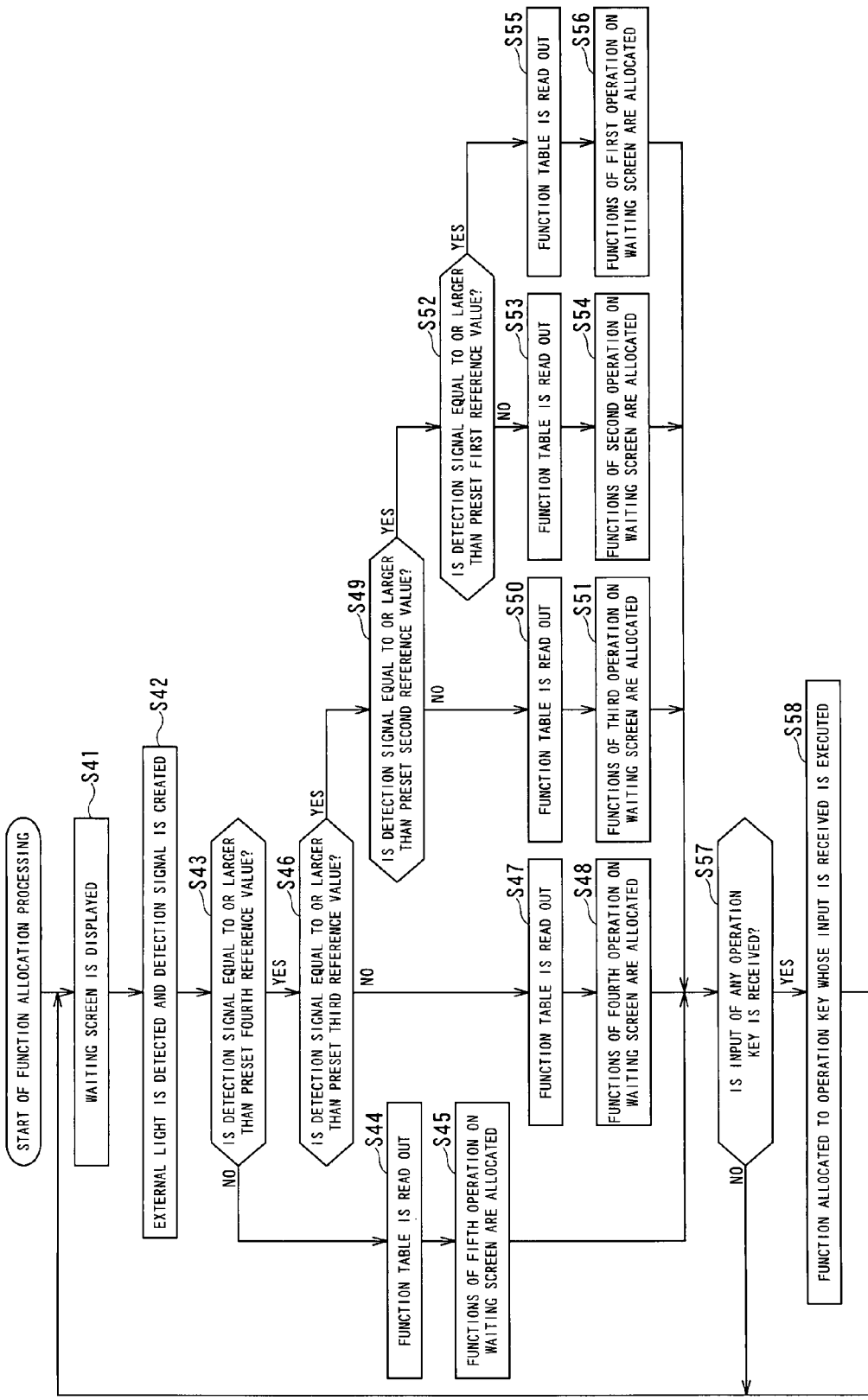
FIG. 11 is a flowchart explaining another function allocation processing in the mobile phone of FIG. 3.

As shown in, for example, a flowchart of FIG. 11, it is sequentially determined whether the detection signal generated by the illumination sensor 20 is larger than a fourth reference value, a third reference value, a second reference value, or a first reference value (fourth reference value<third reference value<second reference value<first reference value). Then, the functions on the waiting screen are allocated according to the luminance intensity (amount of light) of the external light contained in the detection signal likewise the processings at the steps S3 to S7 of FIG. 4.

First operation functions on the waiting screen, second operation functions on the waiting screen, third operation functions on the waiting screen, fourth operation functions on the waiting screen, or fifth operation functions on the waiting screen luminance intensity are sequentially allocated to the operation keys 14 from a larger amount of luminance intensity (amount of light) according to the luminance intensity (amount of light) of the external light of the mobile phone 1 detected through the external light detection slit 51 as shown in, for example, FIGS. 10A to 10E.

In the example of FIG. 10, "English one-byte large characters" are allocated to the operation keys 14 in an "external light 1" in which the luminance intensity (amount of light) is large first, "English one-byte small characters" is allocated to the operation keys 14 in an "external light 2" in which the luminance intensity (amount of light) is large second, "English two-byte large characters" are allocated to the operation keys 14 in an "external light 3" in which the luminance intensity (amount of light) is large third, "English two-byte small characters" are allocated to the operation keys 14 in an "external light 4" in which the luminance intensity (amount of light) is large fourth, and then a function as a "selection/determination of cursor" is allocated to the operation keys 14 in a "blocked light" in which the external light is blocked.

Further, although the functions are allocated to the operations on the waiting screen in the function allocation processing explained with reference to the flowchart of FIG. 11, the functions may be allocated to the operations on the mail generation screen or may be allocated according to various types of functions.

Further, since the processings from the steps S41 to S58 of FIG. 11 are fundamentally the same as those from the steps S1 to S9 of FIG. 4, explanation of the processings is omitted herein to prevent repeated explanation.

With this arrangement, it is possible to allocate more functions by the minimum possible number of all the operation keys 14 by using the external light detected by the illumination sensor 20 as the shift. Accordingly, since it is sufficient to provide the mobile phone 1 with the minimum possible number of the operation keys 14, the number of the operation keys disposed to the mobile phone 1 can be greatly reduced.

Further, even if the size of the mobile phone 1 is rapidly reduced by more greatly reducing the number of the operation keys 14 disposed to the mobile phone 1, the size of the respective operation keys 14 can be maintained or more increased. As a result, the operability of the mobile phone 1 can be more improved while multifunctioning the mobile phone 1.

As described above, the number of the operation keys 14 (or buttons) can be greatly reduced without reducing the number of functions mounted on the mobile phone 1, and the operability of the mobile phone 1 can be more improve even if the size thereof is reduced.

Furthermore, in the embodiment of the present invention, although the illumination sensor 20 is used as the shift key, the present invention is not limited thereto, and, for example, a microphone, which detects the noise in the vicinity of the mobile phone 1, may be used as the shift key. Specifically, the microphone is disposed at position which can be covered with, for example, a hand, a finger, and the like of the user, and the functions to be allocated to the operation keys 14 are switched depending on whether or not the microphone is covered. It is of course possible to determine the volume of the noise gathered by the microphone at a multistage using a plurality of reference values by causing the user to adjust an area to be covered so that the functions to be allocated to the operation keys 14 may be switched to a larger number of functions at a multistage.

Further, an electrostatic pad may be used as the shift key. That is, the functions to be allocated to the operation keys 14 may be switched depending on whether or not the user comes into contact with the electrostatic pad. It is of course possible to detect the capacitance sensed by the electrostatic pad by causing the user to adjust an area through which the electrostatic pad is covered so that the functions to be allocated to the operation keys 14 may be switched to a larger number of function at a multistage depending on a detected area.

Further, a fingerprint authentication sensor may be used as the shift key. That is, the user may switch the functions to be allocated to the operation keys 14 depending on whether or not a finger and the like, which are previously registered to the fingerprint authentication sensor, are in contact with the fingerprint authentication sensor. It is needless to say that a type of the finger sensed by the fingerprint authentication sensor may be detected by causing the user to adjust a type of a finger with which the fingerprint authentication sensor is covered (a fifth finger, a third finger, and the like) so that so that the functions to be allocated to the operation keys 14 may be switched to a larger number of function at a multistage depending on a type of a detected finger.

In the embodiment of the present invention, the magnet sensors 19*a* and 19*b* used to detect the open/close state of the mobile phone 1 may be used in place of the illumination sensor 20 so that they detect the open/close state of the mobile phone 1 as well as act as the shift key at the same time. With this arrangement, it is not necessary to newly dispose an illumination sensor 20 used as the shift key at any position of the mobile phone 1 in addition to the magnet sensors 19*a* and 19*b* which are already disposed to detect the open/close state and the like of the mobile phone 1.

Further, the magnet sensors 19*a* and 19*b* are used to detect the open/close state of the mobile phone 1 and also used as the shift key at the same time in place of the illumination sensor 20, and accordingly, a mounting area which is increased by newly disposing the illumination sensor 20 can be suppressed while maintaining the function of detecting the open/close state of the mobile phone 1 which is heretofore executed by the magnet sensors 19*a* and 19*b*.

Further, when, for example, two sets of the illumination sensors 20 are provided in place of the magnet sensors 19*a* and 19*b*, since the mobile phone 1 must be previously opened for the user to operate the operation keys 14. Thus, when an input receiving processing is executed by the user using the illumination sensors 20 in the state that the mobile phone 1 is opened, it is not necessary to determine and detect whether the first and second housings 12, 13 are closed by the illumination sensors 20 or the illumination sensors are blocked by the user.

Although the external light irradiated to the mobile phone 1, the volume of noise in the vicinity of the mobile phone 1, and the type of a contacting finger of the user can be detected by using the illumination sensor 20, the microphone, the electrostatic pad, and the fingerprint authentication sensor, that which can be detected by these sensors is defined as "a state of the mobile phone 1".

Further, the side 16 key disposed to the mobile phone 1 may be used as the shift key. That is, the functions to be allocated to the operation keys 14 may be switched depending whether or not the side key 16 is depressed by the user.

Furthermore, it is preferable to use an illumination sensor, which can sense at least the luminance intensity (amount of light) of the back light of the liquid crystal display 17, as the illumination sensor 20 used for the present invention so as to act as the shift key even if the vicinity thereof is dark.

Still furthermore, in the embodiment of the present invention, the predetermined functions of operation are allocated to the operation keys 14 by determining whether or not the detection signal generated by the illumination sensor 20 is larger than the predetermined reference value (absolute threshold value). However, the present invention is not limited thereto, and the predetermined functions of operation may be allocated to the operation keys 14 by, for example, calculating the difference value of luminance intensities (amounts of light) of external light based on the detection signal and determining whether or not the calculated difference value is larger than a predetermined reference value. With this operation, the functions desired by the user can be allocated to the operation keys 14 more accurately.

Further, the operation keys 14, the buttons, or the like to which the predetermined functions of operation can be allocated are defined as "input units".

In addition, the present invention can be also applied to a PDA, a personal computer, a mobile game machine, a mobile music player, a mobile image player, and other information processing apparatuses, as well as the mobile phone 1.

Further, a series of the processings explained in the embodiment of present invention may be also executed by software.

Furthermore, although the embodiment of the present invention shows the example in which the processings at the steps of the flowcharts are time sequentially executed in the order shown in the flowcharts, they need not be always executed time sequentially, and the embodiment also may include processings which are executed in parallel or individually.

What is claimed is:

1. An information processing apparatus comprising:
   a generation unit which detects a state of an external light detection hole formed in a surface of the information processing apparatus and which generates a detection signal according to a luminous intensity of external light irradiated to the information processing apparatus;
   a determination unit which determines whether the detection signal generated by the generation unit is larger than a predetermined reference value; and
   an allocation unit which selectively allocates one of a plurality of predetermined functions of operation to an input unit based on whether or not the generated detection signal is determined as being larger than the predetermined reference value by the determination unit by accessing a table in which the input unit and the plurality of predetermined functions of operation are set to previously correspond to each other and be stored therein,
   wherein the predetermined reference value comprises a plurality of predetermined reference values, the determination unit is configured to sequentially determine whether the detection signal generated by the generation unit is larger than each of the plurality of predetermined reference values, and the allocation unit is configured to allocate selectively one of the plurality of predetermined functions of operation to the input unit based on the luminous intensity of the external light contained in the detection signal.

2. The information processing apparatus according to claim 1, wherein the allocation unit allocates the one of the plurality of predetermined functions of operation to the input unit when at least one of a waiting screen and a mail generation screen is displayed.

3. The information processing apparatus according to claim 1, further comprising:
- an input receiving unit configured to receive an input of a switch key for switching the one of the plurality of predetermined functions of operation allocated to the input unit by the allocation unit to another predetermined function of operation; and
- a switching unit configured to switch, when the input of the switch key is received by the input receiving unit, the one of the plurality of predetermined functions of operation allocated to the input unit by the allocation unit to the other predetermined function of operation.

4. The information processing apparatus according to claim 1, wherein the generation unit comprises at least one of an illumination sensor, a microphone unit, an electrostatic pad, a fingerprint authentication sensor, and a side key disposed at a predetermined position of the information processing apparatus.

5. The information processing apparatus according to claim 1, wherein the determination unit determines that the detection signal generated by the generation unit is not larger than a predetermined reference value when the external light detection hole is covered.

6. The information processing apparatus according to claim 5, wherein when the determination unit determines that the detection signal generated by the generation unit is not larger than a predetermined reference value, the allocation unit selectively allocates one of a plurality of predetermined shift key functions of operation.

7. The information processing apparatus according to claim 1, wherein the determination unit determines that the detection signal generated by the generation unit is larger than a predetermined reference value when the external light detection hole is not covered.

8. The information processing apparatus according to claim 7, wherein when the determination unit determines that the detection signal generated by the generation unit is larger than a predetermined reference value, the allocation unit selectively allocates one of a plurality of predetermined ordinary functions of operation.

* * * * *